(12) United States Patent
Han (10) Patent No.: US 12,353,676 B2
(45) Date of Patent: Jul. 8, 2025

(54) DATA ISOLATION METHOD AND ELECTRONIC DEVICE

(71) Applicant: VIVO MOBILE COMMUNICATION CO., LTD., Dongguan (CN)

(72) Inventor: Xu Han, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 73 days.

(21) Appl. No.: 18/225,078

(22) Filed: Jul. 21, 2023

(65) Prior Publication Data

US 2023/0359324 A1 Nov. 9, 2023

Related U.S. Application Data

(63) Continuation of application No. PCT/CN2022/072500, filed on Jan. 18, 2022.

(30) Foreign Application Priority Data

Jan. 22, 2021 (CN) .......................... 202110089553.9

(51) Int. Cl.
 *G06F 3/04817* (2022.01)
 *G06F 3/0486* (2013.01)
 *G06F 9/451* (2018.01)

(52) U.S. Cl.
 CPC ........ *G06F 3/04817* (2013.01); *G06F 3/0486* (2013.01); *G06F 9/451* (2018.02); *G06F 2203/04803* (2013.01)

(58) Field of Classification Search
 CPC .... G06F 3/04817; G06F 3/0486; G06F 9/451; G06F 2203/04803
 See application file for complete search history.

(56) References Cited

U.S. PATENT DOCUMENTS

| | | | |
|---|---|---|---|
| 8,499,248 B1* | 7/2013 | Keel | G06F 3/04842 |
| | | | 715/753 |
| 2003/0160825 A1* | 8/2003 | Weber | G06F 9/453 |
| | | | 715/769 |

(Continued)

FOREIGN PATENT DOCUMENTS

| | | | |
|---|---|---|---|
| CN | 103235903 A | * | 8/2013 |
| CN | 103235903 B | | 12/2015 |

(Continued)

OTHER PUBLICATIONS

International Search Report issued in corresponding International Application No. PCT/CN2022/072500, mailed Apr. 2, 2022, 4 pages.

(Continued)

*Primary Examiner* — Shahid K Khan
(74) *Attorney, Agent, or Firm* — IPX PLLC (57) ABSTRACT

A data isolation method and an electronic device are provided. The data isolation method includes: receiving a first input that is performed by a user for a first split screen in a split screen display mode; displaying an input interface of isolation space in a window of the first split screen in response to the first input; receiving a second input that is performed by the user for a first application in a window of a second split screen in the split screen display mode; and storing first target data of the first application to the isolation space in response to the second input.

18 Claims, 10 Drawing Sheets

(56) References Cited

U.S. PATENT DOCUMENTS

| | | | | |
|---|---|---|---|---|
| 2004/0133550 | A1* | 7/2004 | Okamura | G06F 16/16 |
| | | | | 707/E17.031 |
| 2005/0256864 | A1* | 11/2005 | Semerdzhiev | G06F 16/10 |
| | | | | 707/999.005 |
| 2006/0271595 | A1* | 11/2006 | Davis | G06F 3/0486 |
| 2006/0271602 | A1* | 11/2006 | Davis | G06F 16/10 |
| 2008/0281874 | A1* | 11/2008 | Koga | G06F 16/113 |
| 2016/0239287 | A1* | 8/2016 | Lim | G06F 3/04842 |
| 2018/0032246 | A1 | 2/2018 | Kim | |

FOREIGN PATENT DOCUMENTS

| | | | | |
|---|---|---|---|---|
| CN | 105138302 | A | * 12/2015 | |
| CN | 106095377 | A | * 11/2016 | G06F 3/1446 |
| CN | 107357483 | A | 11/2017 | |
| CN | 108681431 | A | 10/2018 | |
| CN | 112073560 | A | * 12/2020 | |
| CN | 112764614 | A | 5/2021 | |
| JP | 2019144615 | A | 8/2019 | |
| WO | 2016023265 | A1 | 2/2016 | |

OTHER PUBLICATIONS

First Office Action issued in corresponding CN Patent Application No. 202110089553.9, dated Jan. 5, 2022, 5 pages.

Extended European Search Report issued in related European Application No. 22742144.3, mailed Mar. 19, 2024, 11 pages.

* cited by examiner

DATA ISOLATION METHOD AND ELECTRONIC DEVICE

CROSS-REFERENCE TO RELATED APPLICATIONS

This application is a continuation of International Application No. PCT/CN2022/072500, filed on Jan. 18, 2022, which claims priority to Chinese Patent Application No. 202110089553.9, filed on Jan. 22, 2021. The entire contents of each of the above-identified applications are expressly incorporated herein by reference.

TECHNICAL FIELD

This application pertains to the field of electronic device technologies, and in particular, to a data isolation method and an electronic device.

BACKGROUND

With the development of communication technologies, increasingly more functions are available on electronic devices. For example, a screen splitting function is widely used on electronic devices. In addition, users attach increasingly more importance to the security of their own data, and some privacy data or important data needs to be hidden or backed up to isolate the data from data that is being used.

However, a current manner of using the screen splitting function is mainly as follows: isolating two operation areas, so that an Application (APP) on a split screen can be operated while an APP on a home screen is used for operation. A data isolation method is mainly to separately store data such as a picture or a video by transferring the data to a "safe box," for example, uploading the data to the cloud or by using a similar function.

An existing screen splitting function is relatively simple, and a screen of the electronic device can be simply divided into two operation areas, and different APPs are separately operated. Other requirements cannot be satisfied, especially the use of data isolation wastes a convenient operation scenario.

SUMMARY

This application provides a data isolation method and an electronic device.

According to a first aspect, an embodiment of this application provides a data isolation method, and the method includes:
  receiving a first input that is performed by a user for a first split screen in a split screen display mode;
  displaying an input interface of isolation space in a window of the first split screen in response to the first input;
  receiving a second input that is performed by the user for a first application in a window of a second split screen in the split screen display mode; and
  storing first target data of the first application to the isolation space in response to the second input.

According to a second aspect, an embodiment of this application provides a data isolation apparatus, including:
  a first receiving module, configured to receive a first input that is performed by a user for a first split screen in a split screen display mode;
  a display module, configured to display an input interface of isolation space in a window of the first split screen in response to the first input;
  a second receiving module, configured to receive a second input that is performed by the user for a first application in a window of a second split screen in the split screen display mode; and
  a data storage module, configured to store first target data of the first application to the isolation space in response to the second input.

According to a third aspect, an embodiment of this application further provides an electronic device, where the electronic device includes a processor, a memory, and a program or an instruction that is stored in the memory and that can run on the processor, and when the program or the instruction is executed by the processor, the steps of the method according to the first aspect are implemented.

According to a fourth aspect, an embodiment of this application further provides a readable storage medium, where the readable storage medium stores a program or an instruction, and when the program or instruction is executed by a processor, the steps of the method according to the first aspect are implemented.

According to a fifth aspect, an embodiment of this application provides a chip. The chip includes a processor and a communication interface. The communication interface is coupled to the processor. The processor is configured to run a program or an instruction to implement the method according to the first aspect.

According to a sixth aspect, an embodiment of this application provides a computer program product, where the computer program product is stored in a non-volatile storage medium, and the computer program product is executed by at least one processor to implement the method according to the first aspect.

According to a seventh aspect, an embodiment of this application provides an electronic device, configured to perform the steps in the method according to the first aspect.

In this way, in the embodiments of this application, a first input that is performed by a user for a first split screen in a split screen display mode is received; an input interface of isolation space is displayed in a window of the first split screen in response to the first input, so that a user can perform an operation of entering the isolation space from the window of the first split screen in a split screen state; a second input that is performed by the user for a first application in a window of a second split screen in the split screen display mode is received; and first target data of the first application is stored to the isolation space in response to the second input, so that interaction between the isolation space and the window of the second split screen can be implemented, and a function of performing data isolation by using the split screen is satisfied.

DETAILED DESCRIPTION

The following describes the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

The terms "first," "second," and the like in the description and the claims of this application are used to distinguish between similar objects, and do not need to be used to describe a specific order or sequence. It should be understood that, terms used in such a way are interchangeable in proper circumstances, so that the embodiments of this application can be implemented in an order other than the order illustrated or described herein. Objects classified by "first," "second," and the like are usually of a same type, and the number of objects is not limited. For example, there may be one or more first objects. In addition, in the specification and the claims, "and/or" represents at least one of connected objects, and a character "/" generally represents an "or" relationship between associated objects.

A data isolation method provided in the embodiments of this application is described in detail below with reference to the accompanying drawings by using specific embodiments and application scenarios thereof.

The method in the embodiments of this application is applied to user equipment, and the User Equipment (UE) may be an access terminal, a subscriber unit, a subscriber station, a mobile site, a mobile station, a remote station, a remote terminal, a mobile device, a user terminal, a terminal, a wireless communications device, a user agent, or a user apparatus. The terminal device may alternatively be a cellular phone, a cordless phone, a Session Initiation Protocol (SIP) phone, a Wireless Local Loop (WLL) station, a Personal Digital Assistant (PDA), a hand-held device having a wireless communication function, a computing device or another processing device connected to a wireless modem, an on-board device, and a wearable device.

In some implementations, the method in the embodiment of this application is applied to an electronic device. The electronic device may be a mobile terminal with data storage, reception, and display, such as a mobile phone, a tablet computer, or a wearable intelligent device. This is not limited in the embodiments of this application.

Figure 1:
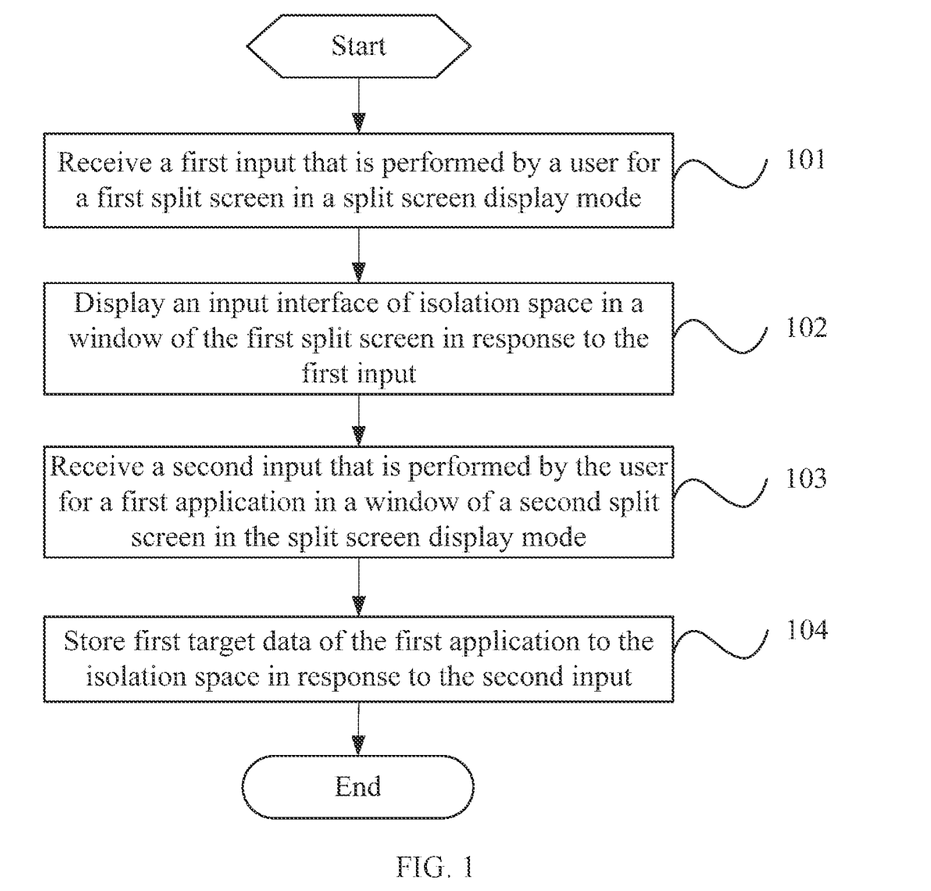
FIG. 1 is a first flowchart of a data isolation method according to an embodiment of this application.

As shown in FIG. 1, an embodiment of this application provides a data isolation method, including:

Step 101. Receive a first input that is performed by a user for a first split screen in a split screen display mode.

In this embodiment of this application, an electronic device enters the split screen display mode, that is, a window of the first split screen and a window of a second split screen are simultaneously displayed on a screen of the electronic device. The electronic device may enter the split screen display mode in the following manner: three fingers slide on the screen at the same time, or there may be another manner of entering the split screen display mode.

The first input may be an "isolation space" virtual button disposed on the window of the first split screen. The user may press the virtual button to enter the first input, or the user may draw a specific shape in the window of the first split screen, for example, a circle. In this way, the electronic device identifies the first input entered by the user, and another manner of entering the first input also falls within the protection scope of this embodiment of this application.

Step 102: Display an input interface of isolation space in a window of the first split screen in response to the first input.

In this embodiment of this application, the input interface of the isolation space may be an input interface obtained after all windows of the first split screen are updated and displayed as the isolation space after the electronic device responds to the first input, or may be an input interface obtained after some windows of the first split screen are displayed as the isolation space, and display content in remaining windows of the first split screen remains unchanged.

Step 103: Receive a second input that is performed by the user for a first application in a window of a second split screen in the split screen display mode.

In this embodiment of this application, the second input may be an input for pressing the first application in the window of the second split screen for a period of time and dragging the first application, or may be an input for selecting and dragging some data in the first application, or may be another input for moving an icon or data corresponding to the first application. This is not limited in this embodiment of this application.

Step 104: Store first target data of the first application to the isolation space in response to the second input.

In this embodiment of this application, after the electronic device responds to a dragging input for a first icon, the entire APP of the first application may be moved to the isolation space. After the electronic device responds to a dragging input for the first target data in the first application, the first target data in the first application may be stored in the isolation space, for example, the first application is an album APP and the first target data is a picture in an album.

In this embodiment of this application, a first input that is performed by a user for a first split screen in a split screen display mode is received; an input interface of isolation space is displayed in a window of the first split screen in response to the first input, so that the user can perform an operation of entering the isolation space from the window of the first split screen in the split screen display mode; a second input that is performed by the user for a first application in a window of a second split screen in the split screen display mode is received; and first target data of the first application is stored to the isolation space in response to the second input, so that interaction between the isolation space and the window of the second split screen can be implemented, a function of performing data isolation by using the split screen is satisfied, operations are convenient, and it is also convenient for the user to view data information stored in the isolation space.

In some implementations, the method further includes:
receiving a third input that is performed by the user for second target data of a second application in the input interface of the isolation space; and
editing the second target data in response to the third input.

In this embodiment of this application, editing controls such as "copy," "delete," "upload to the cloud," "one-button switch," and "secondary encryption" may be further included in the input interface of the isolation space. The third input may be: selecting the second target data of the second application in the input interface of the isolation space after pressing the second target data for a period of time, and perform "copy," "delete," "upload to the cloud," "one-button switch," or "secondary encryption" on the second target data based on the selected editing control.

In some implementations, the displaying an input interface of isolation space in a window of the first split screen in response to the first input includes:
displaying an identity authentication input interface;
receiving a fourth input that is performed by the user in the identity authentication input interface; and
displaying the input interface of the isolation space in the window of the first split screen when input information of the fourth input is successfully matched with pre-stored identity information.

In this embodiment of this application, to improve confidentiality of the isolation space, when the input interface of the isolation space displayed in the window of the first split screen enters the isolation space, identity authentication needs to be performed. In some implementations, an identity authentication manner may be password authentication, fingerprint authentication, or pupil authentication. In some implementations, the fourth input that is input in an identity authentication interface may be a password, a fingerprint, or a pupil image. When the input password, fingerprint, or pupil image is consistent with an authentication password, an authentication fingerprint, or an authentication pupil that is pre-stored in the electronic device, identity authentication succeeds, and the isolation space is entered.

Figure 2:
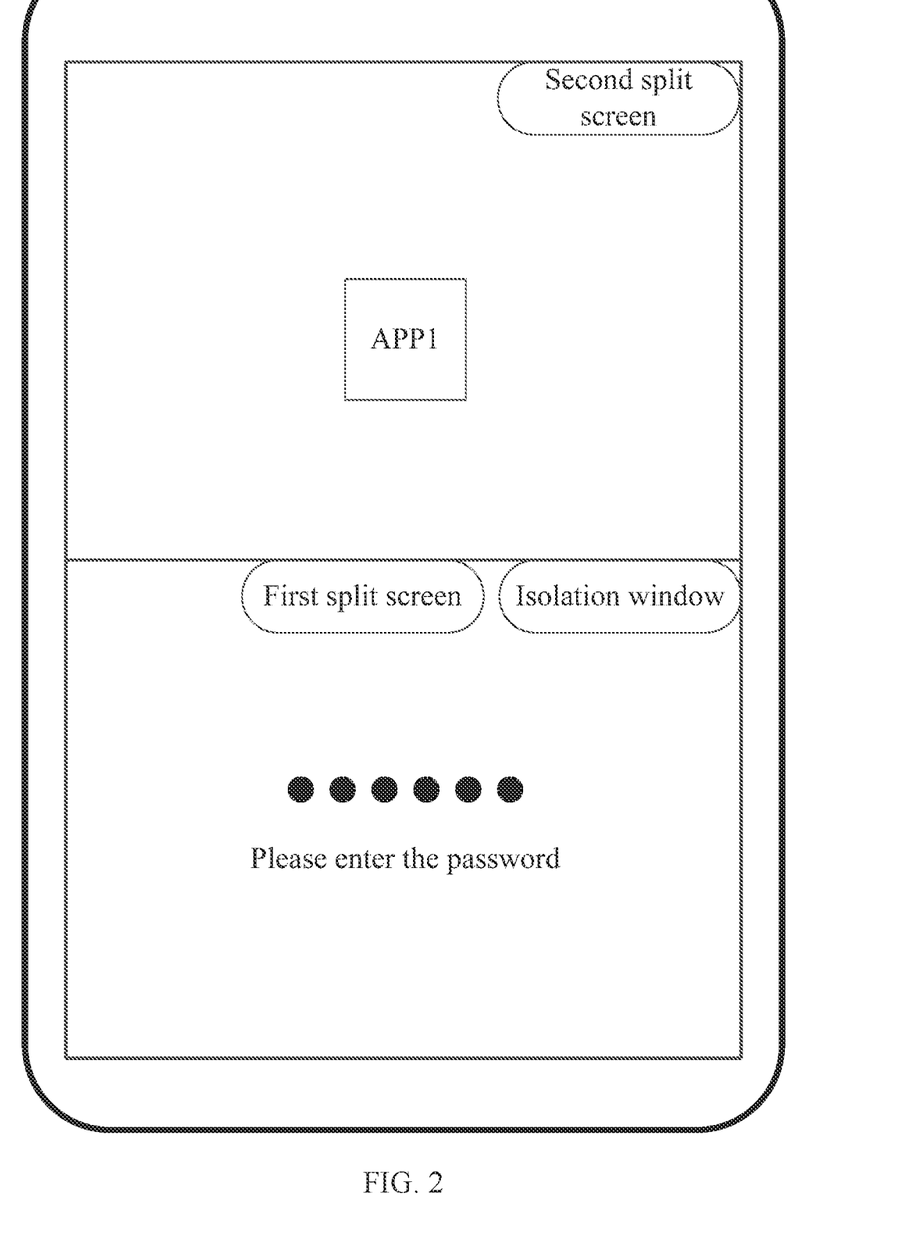
FIG. 2 is a schematic diagram of a split screen display mode according to an embodiment of this application.

After the split screen display mode is entered, an "isolation space" button is tapped to enter the input interface of the isolation space, and the isolation space is entered in a separately set information authentication manner. FIG. 2 shows an example of entering the isolation space by entering a password according to an embodiment of this application. It should be noted that, to ensure security, a password in the isolation space needs to be set separately and cannot be consistent with a password for entering the electronic device. If the password is not set for entering the isolation space for the first time, a prompt box pops up in a window of the isolation space to remind the user to set a password for the isolation space.

Figure 3:
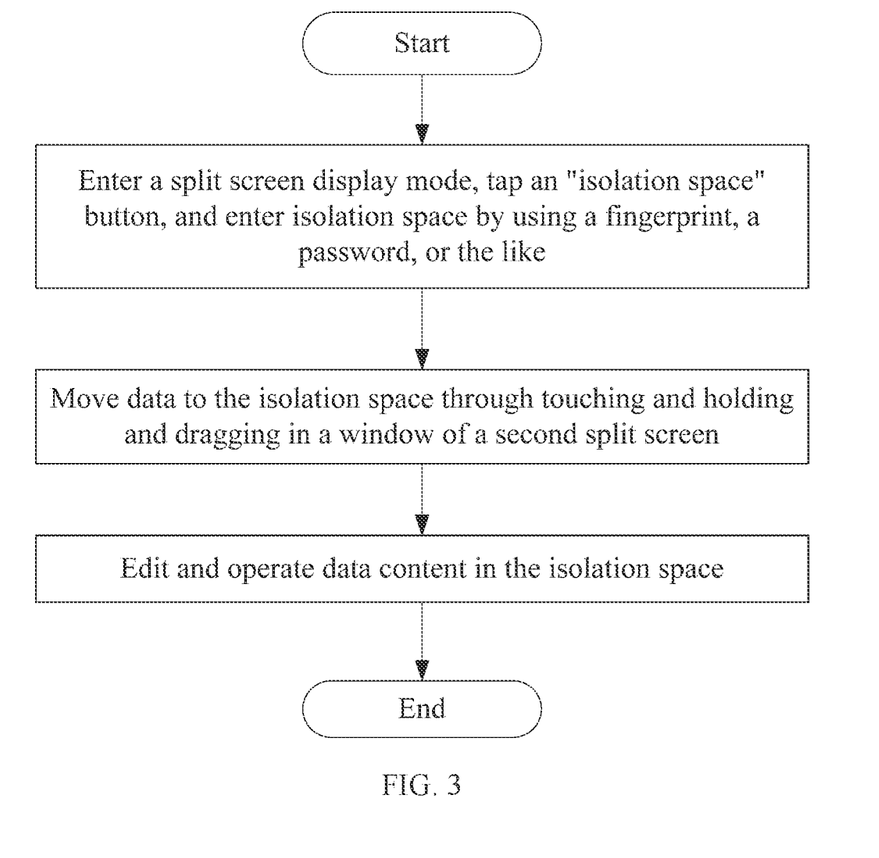
FIG. 3 is a second flowchart of a data isolation method according to an embodiment of this application.

A procedure of the data isolation method is described in detail below with reference to FIG. 3.

The split screen display mode in the electronic device is entered, the "isolation space" button is tapped, and the isolation space is entered in a manner such as entering a fingerprint or entering a password. Then, the first application in the window of the second split screen is selected, the data of the first application is moved in the window of the second split screen to the isolation space through dragging, and data contained in the isolation space is edited and operated.

In some implementations, in a case that the first target data is partial data of the first application, the storing first target data of the first application to the isolation space includes:
creating a target application icon corresponding to the first target data in the input interface of the isolation space, where the target application icon is an icon of the first application; and
associating and storing the first target data and the target application icon.

In this embodiment of this application, there are two cases in which the first target data in the first application is moved to the isolation space for storage by touching and holding and dragging in the window of the second split screen. One is a case in which the first target data is partial data of the first application, that is, partial data content in the first application is moved to the isolation space. The other is a case in which the first target data is all data of the first application, that is, the entire first application is moved to the isolation space.

Figure 4:
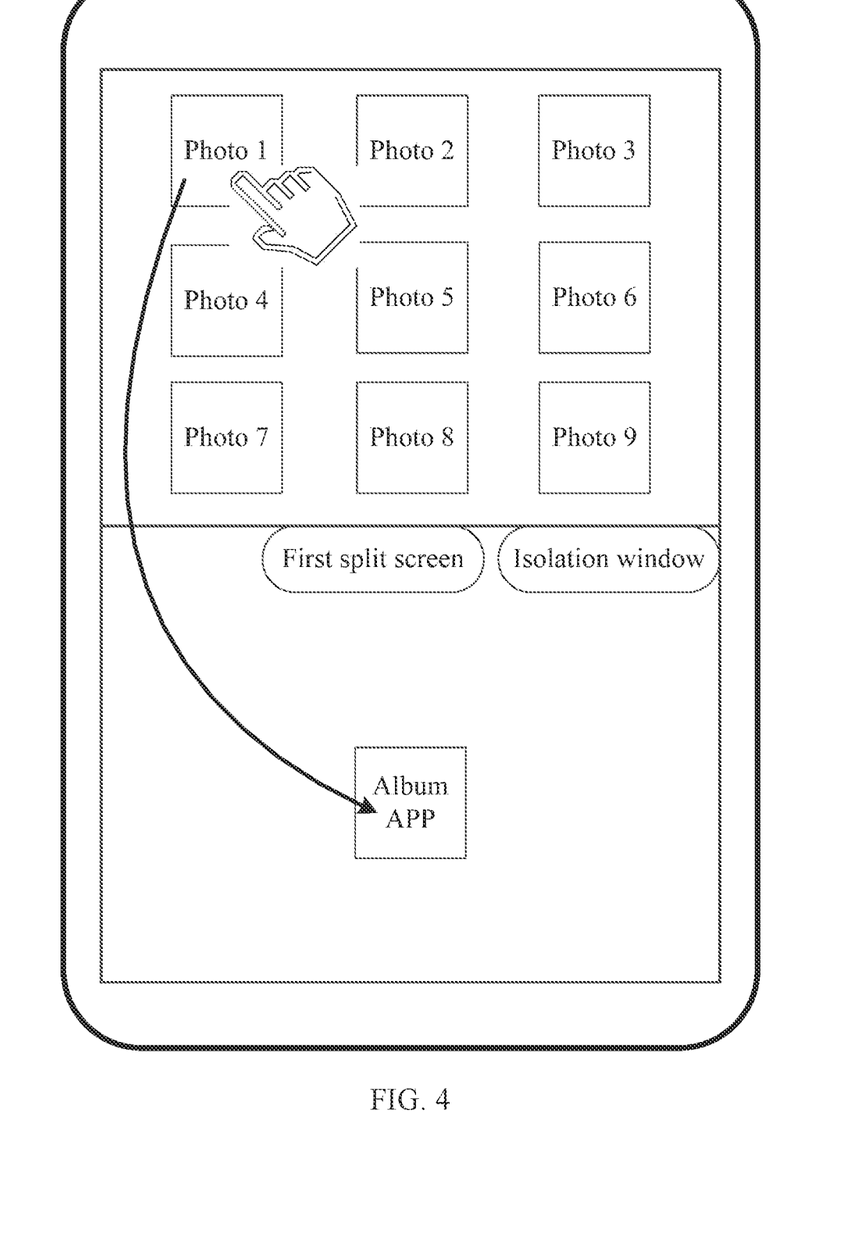
FIG. 4 is a first schematic diagram of storing first target data to isolation space according to an embodiment of this application.

A process of moving partial data content in the first application to the isolation space is described in detail as follows:

Partial data in the first application may be picture data in an album APP or audio data in a music player. In this embodiment of this application, the picture data in the album is used as an example for description. One or more pictures are selected from the album APP in the window of the second split screen and dragged into the isolation space. As shown in FIG. 4, a total of nine photos: photos 1, 2, 3, . . . , and 9 of the album APP are displayed in the window of the second split screen. The photo 1 is selected as the first target data, and the photo 1 is dragged to the isolation space. If the album APP does not exist in the isolation space, an icon of the album APP, that is, the target application icon is automatically created, and the photo 1 is stored at a corresponding position of the album APP. If the album APP exists in the isolation space, the photo 1 is automatically stored in the album APP. In this case, the photo 1 in the album APP in the window of the second screen is automatically deleted, and the photo 1 is stored in the isolation space.

In some implementations, in a case that the first target data is all data of the first application, the storing first target data of the first application to the isolation space includes:
copying an icon of the first application;
displaying the copied icon of the first application in the input interface of the isolation space; and associating and storing the first target data and the copied icon of the first application.

In this embodiment of this application, in a case that the first target data is all data of the first application, the entire first application is moved to the isolation space. The user may perform a touching and holding and dragging operation on the icon of the first application in the window of the second split screen, and copy all data of the first application into the isolation space.

Figure 5:
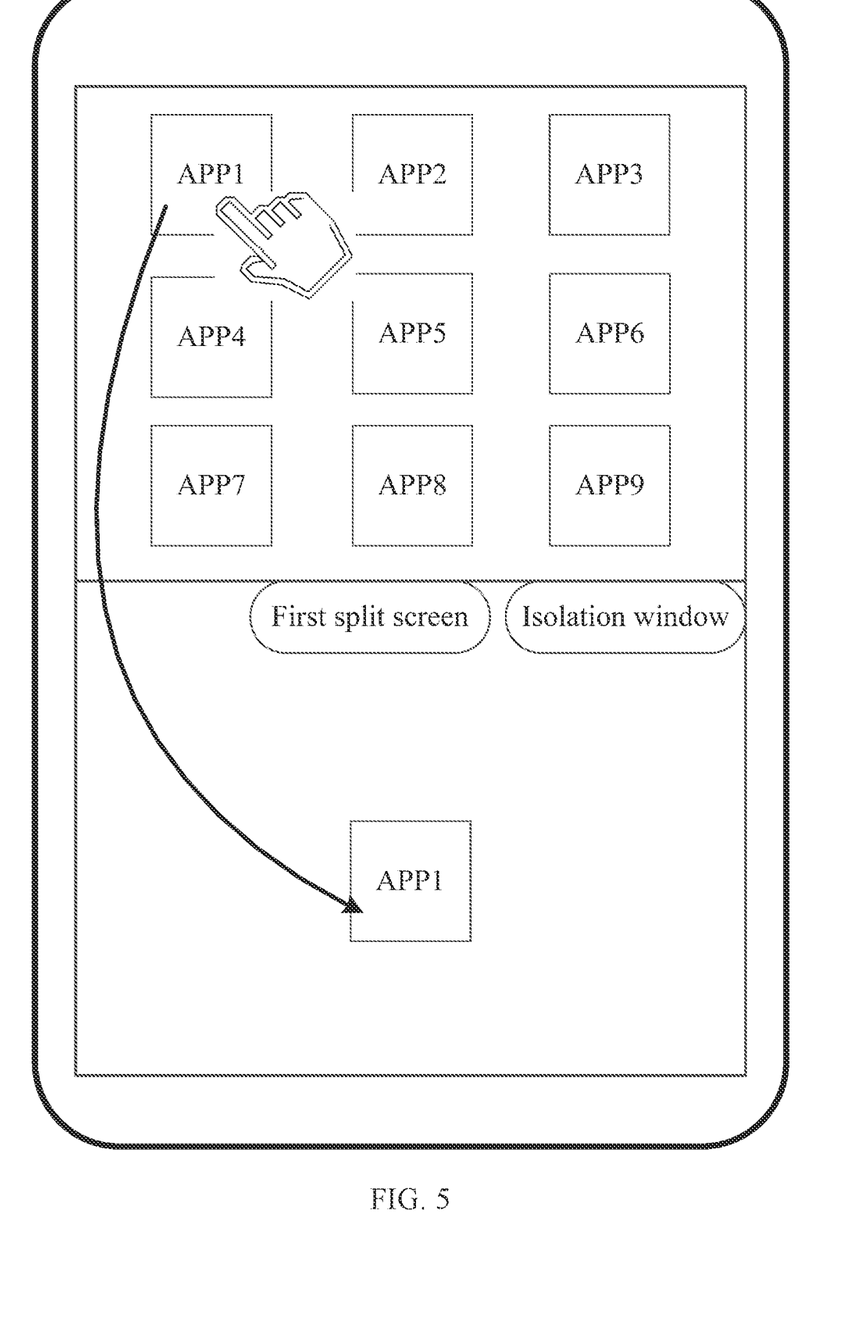
FIG. 5 is a second schematic diagram of storing first target data to isolation space according to an embodiment of this application.
Figure 6:
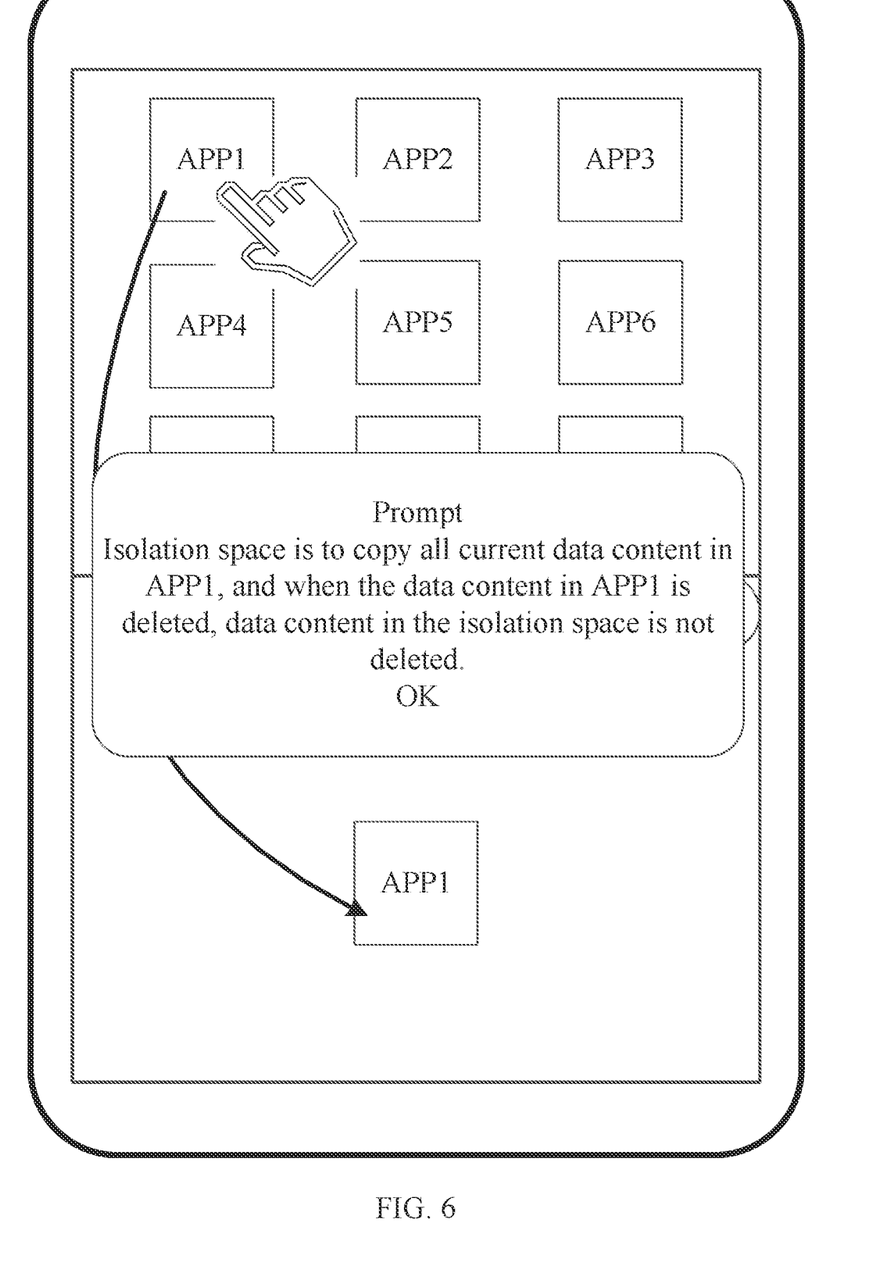
FIG. 6 is a third schematic diagram of storing first target data to isolation space according to an embodiment of this application.

A process of moving all data content in the first application to the isolation space is described in detail as follows:

As shown in FIG. 5, the window of the second split screen includes a first application (APP1), a second application (APP2), a third application (APP3), . . . , and a ninth application (APP9). The APP1, that is, the first target data is selected by touching and holding, and if the APP1 is dragged to the isolation space, a prompt box pops up. As shown in FIG. 6, the user is prompted to copy all data content of the APP1 in the window of the second split screen to the isolation space. When the user deletes the data content of the APP1 in the window of the second split screen, the data in the isolation space is not deleted. In this embodiment of this application, as an example, the APP1 is an album APP. When the album APP is dragged to the isolation space, all picture and video content of the album APP is stored in the isolation space.

In some implementations, the method further includes:
receiving a fifth input that is performed by the user for the first application in the window of the second split screen; and
in a case that there is a difference between third target data corresponding to the fifth input and the first target data stored in the isolation space, updating the first target data in the isolation space based on the third target data.

Figure 7:
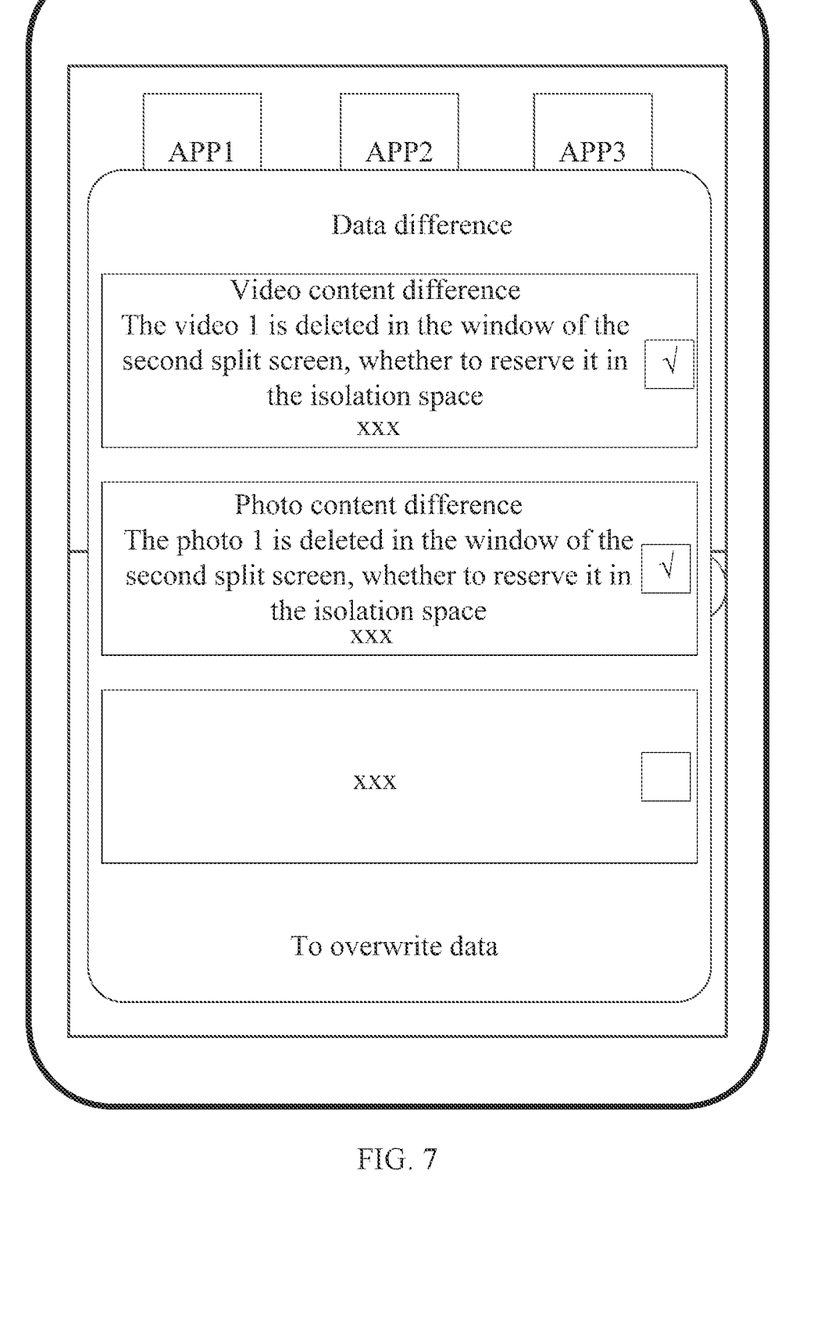
FIG. 7 is a fourth schematic diagram of storing first target data to isolation space according to an embodiment of this application.

In this embodiment of this application, the foregoing example is still used for description. After the user copies the APP1 into the isolation space, if the APP1 in the window of the second split screen continues to store other data, when the user wants to store the APP1 in the isolation space again, the user touches and holds the APP1 again, and drags the APP1 to the isolation space. In this case, a difference comparison prompt box is displayed to prompt the user of a data difference between the APP1 in the window of the second split screen and the APP1 in the isolation space, and whether the difference data is retained for covering is determined by a selection operation of the user. As shown in FIG. 7, that the APP1 is an album APP is still used as an example for description. When the user stores the album APP to the isolation space again, it is detected that a video 1 has been deleted from the album APP in the window of the second split screen, but the video 1 is still retained in the isolation space. A prompt box reminds the user whether or not to retain the video 1 in the isolation space. When a check box is tapped as a tick, it indicates that the video 1 is retained in the isolation space. Otherwise, the video 1 is deleted when the data is overwritten.

Figure 8:
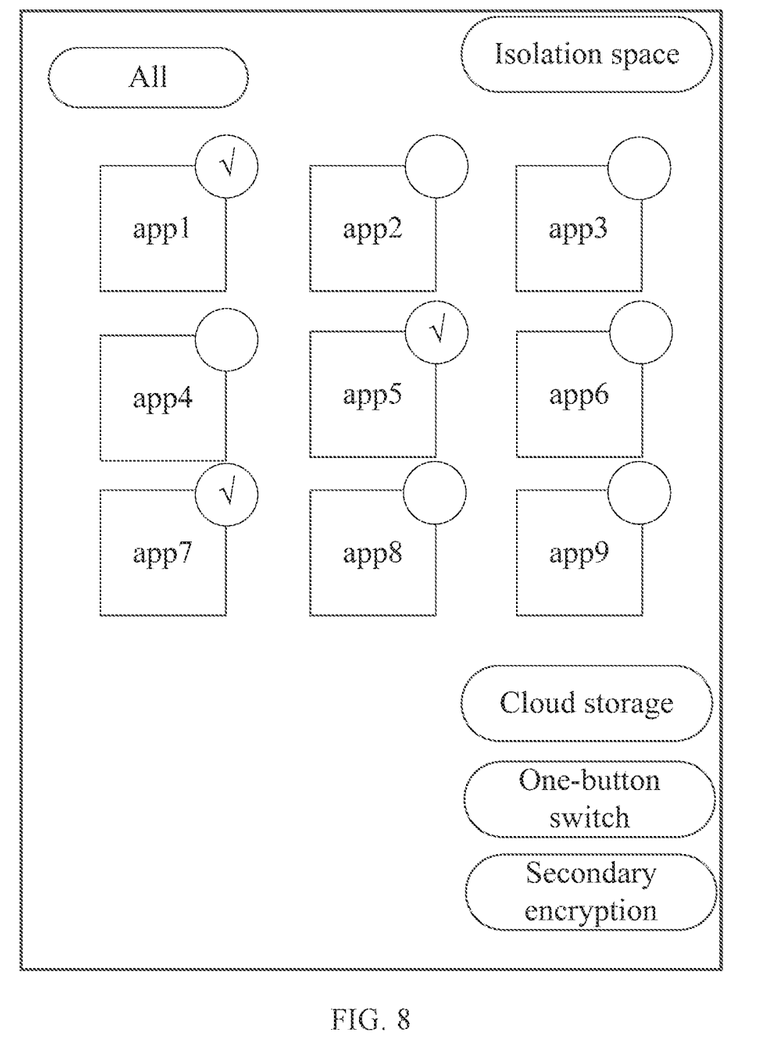
FIG. 8 is a schematic diagram of editing data content in isolation space according to an embodiment of this application.

It should also be noted that after content of the first target data in the first application is stored in the isolation space, data content in the isolation space can be separately operated. As shown in FIG. 8, nine APPs are stored in the isolation space, which are denoted by app1, app2, app3, . . . , and app9 respectively. The isolation space is further provided with a "cloud storage" editing control, a "one-button switch" editing control, and a "secondary encryption" editing control. First, data contained in one or several APPs is selected, e.g., three APPs: app1, app5, and app7 are selected in FIG. 8, and then an editing control is selected to perform an editing operation. If the "cloud storage" editing control is tapped, content selected in the isolation space can be uploaded to the cloud for convenient storage. If the "one-button switch" editing control is tapped, data content selected in the isolation space can be individually switched by using one button, and the selected data content is automatically changed into isolation space of a changed machine. If the changed machine has no isolation space, the selected data content is automatically incorporated into an application on a screen of the changed machine. If the "secondary encryption" editing control is tapped, data content selected in the isolation space is encrypted again, the APP is entered in the isolation space, and a set password needs to be entered again after tapping.

According to the data isolation method provided in this embodiment of this application, a screen splitting function is effectively expanded, and the user can isolate important data and private data without complex operations. In addition, operations are convenient, functions are powerful, and the user can separately isolate data content in the APP, and can also isolate data content in the entire APP. In addition, in the isolation space, the user can conveniently perform cloud backup, one-button switch, and secondary encryption on data.

It should be noted that the data isolation method provided in this embodiment of this application may be performed by a data isolation apparatus or a control module that is in the data isolation apparatus and that is configured to perform the data isolation method. In this embodiment of this application, the data isolation apparatus provided in this embodiment of this application is described by using an example in which the data isolation apparatus performs the data isolation method.

Figure 9:
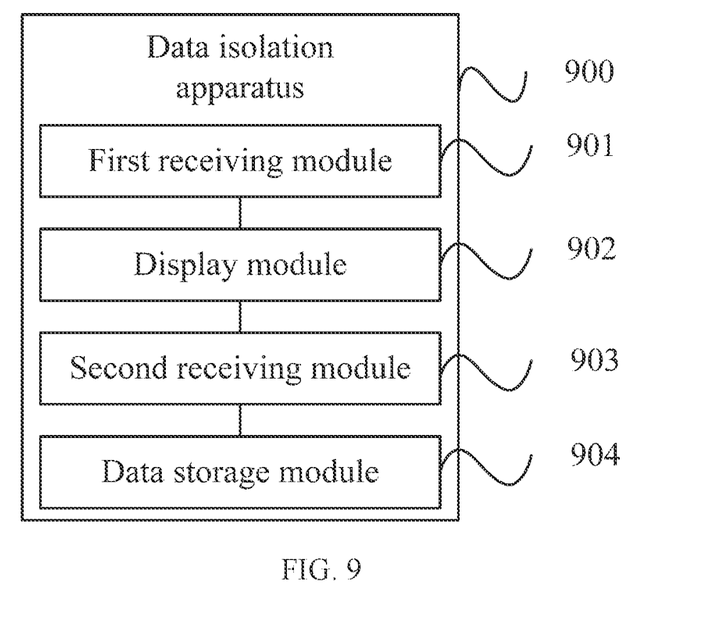
FIG. 9 is a block diagram of a data isolation apparatus according to an embodiment of this application.

FIG. 9 is a block diagram of a data isolation apparatus according to an embodiment of this application. A data isolation apparatus 900 shown in FIG. 9 includes a first receiving module 901, a display module 902, a second receiving module 903, and a data storage module 904.

The first receiving module 901 is configured to receive a first input that is performed by a user for a first split screen in a split screen display mode.

The display module 902 is configured to display an input interface of isolation space in a window of the first split screen in response to the first input.

The second receiving module 903 is configured to receive a second input that is performed by the user for a first application in a window of a second split screen in the split screen display mode.

The data storage module 904 is configured to store first target data of the first application to the isolation space in response to the second input.

According to the data isolation apparatus 900 provided in this embodiment of this application, a first input that is performed by a user for a first split screen in a split screen display mode is received; an input interface of isolation space is displayed in a window of the first split screen in response to the first input, so that a user can perform an operation of entering the isolation space from the window of the first split screen in a split screen state; a second input that is performed by the user for a first application in a window of a second split screen in the split screen display mode is received; and first target data of the first application is stored to the isolation space in response to the second input so that interaction between the isolation space and the window of the second split screen can be implemented, and a function of performing data isolation by using the split screen is satisfied.

In some implementations, the apparatus further includes:
a third receiving module, configured to receive a third input that is performed by the user for second target data of a second application in the input interface of the isolation space; and
an editing module, configured to edit the second target data in response to the third input.

In some implementations, the display module 902 includes:
a first display unit, configured to display an identity authentication input interface;
a first receiving unit, configured to receive a fourth input that is performed by the user in the identity authentication input interface; and
a second display unit, configured to display the input interface of the isolation space in the window of the first split screen when input information of the fourth input is successfully matched with pre-stored identity information.

In some implementations, the data storage module 904 includes:

an icon creating module, configured to create a target application icon corresponding to the first target data in the input interface of the isolation space, where the target application icon is an icon of the first application; and a first storage unit, configured to associate and store the first target data and the target application icon.

In some implementations, the data storage module 904 includes:

an icon copying unit, configured to copy an icon of the first application;

a third display unit, configured to display the copied icon of the first application in the input interface of the isolation space; and a second storage unit, configured to associate and store the first target data and the copied icon of the first application.

In some implementations, the data storage module 904 further includes:

a second receiving unit, configured to receive a fifth input that is performed by the user for the first application in the window of the second split screen; and an updating unit, configured to: in a case that there is a difference between third target data corresponding to the fifth input and the first target data stored in the isolation space, update the first target data in the isolation space based on the third target data.

According to the data isolation apparatus 900 provided in this embodiment of this application, a first input that is performed by a user for a first split screen in a split screen display mode is received; an input interface of isolation space is displayed in a window of the first split screen in response to the first input, so that the user can perform an operation of entering the isolation space from the window of the first split screen in a split screen state; a second input that is performed by the user for a first application in a window of a second split screen in the split screen display mode is received; and first target data of the first application is stored to the isolation space in response to the second input, so that interaction between the isolation space and the window of the second split screen can be implemented, and a function of performing data isolation by using the split screen is satisfied.

The data isolation apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an Ultra-Mobile Personal Computer (UMPC), a netbook, or a Personal Digital Assistant (PDA), and the non-mobile electronic device may be a server, a Network Attached Storage (NAS), a personal computer, a television, a counter, or a self-service machine. This is not specifically limited in this embodiment of this application.

The data isolation apparatus in this embodiment of this application may be an apparatus with an operating system. The operating system may be an Android operating system, may be an iOS operating system, or may be another operating system. This is not specifically limited in this embodiment of this application.

The data isolation apparatus provided in this embodiment of this application can implement processes implemented in the method embodiments of FIG. 1 to FIG. 8. To avoid repetition, details are not described herein again.

According to the apparatus provided in the embodiments of this application, a first input that is performed by a user for a first split screen in a split screen display mode is received; an input interface of isolation space is displayed in a window of the first split screen in response to the first input, so that a user can perform an operation of entering the isolation space from the window of the first split screen in a split screen state; a second input that is performed by the user for a first application in a window of a second split screen in the split screen display mode is received; and first target data of the first application is stored to the isolation space in response to the second input, so that interaction between the isolation space and the window of the second split screen can be implemented, and a function of performing data isolation by using the split screen is satisfied.

It should be noted that the data isolation apparatus provided in the embodiments of this application is an apparatus that can perform the foregoing data isolation method. Therefore, all embodiments of the foregoing data isolation method are applicable to the apparatus, and a same or similar beneficial effect can be achieved.

Figure 10:
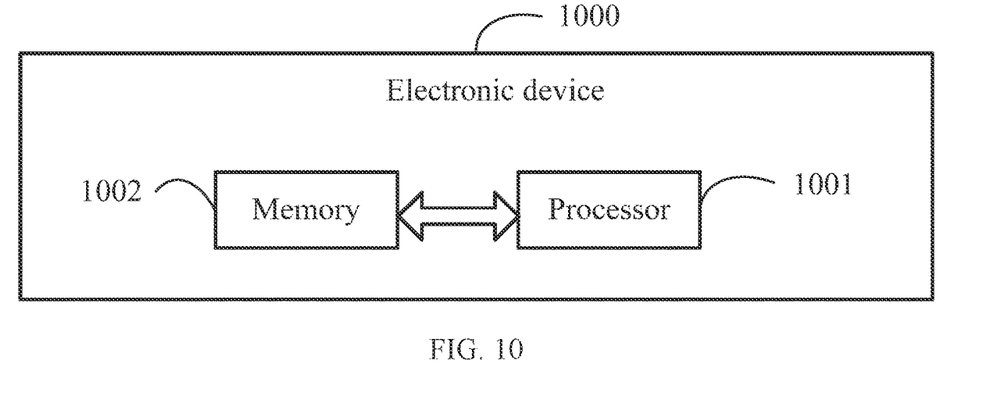
FIG. 10 is a block diagram of an electronic device according to an embodiment of this application.

In some implementations, as shown in FIG. 10, an embodiment of this application further provides an electronic device 1000, including a processor 1001, a memory 1002, and a program or an instruction that is stored in the memory 1002 and that can run on the processor 1001. When the program or the instruction is executed by the processor 1001, the processes of the data isolation method embodiments can be implemented, and the same technical effects can be achieved. To avoid repetition, details are not described herein.

It should be noted that the electronic device in this embodiment of this application includes the foregoing mobile electronic device and the foregoing non-mobile electronic device.

It should be noted that the electronic device provided in this embodiment of this application is an electronic device capable of performing the foregoing data isolation method, and all embodiments of the foregoing data isolation method are applicable to the electronic device, and the same or similar beneficial effects can be achieved.

Figure 11:
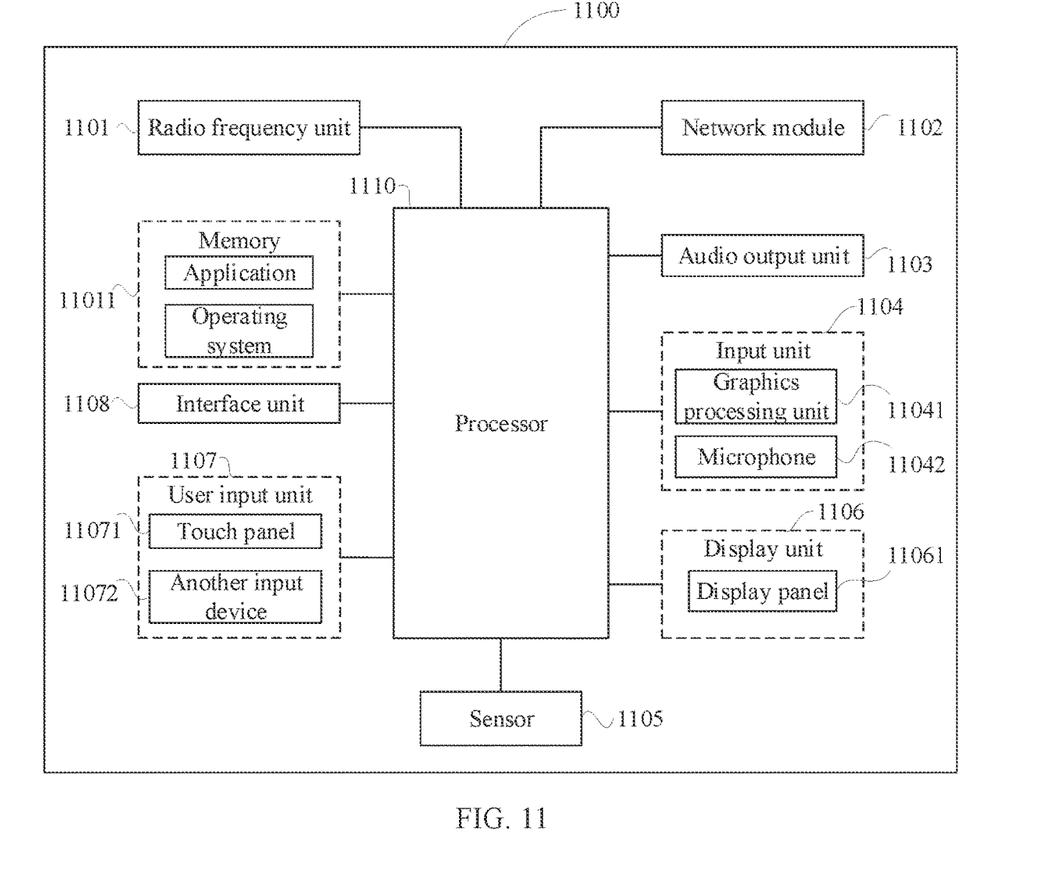
FIG. 11 is a schematic diagram of a hardware structure of an electronic device according to an embodiment of this application.

FIG. 11 is a schematic diagram of a hardware structure of an electronic device for implementing embodiments of this application.

The electronic device 1100 includes, but is not limited to a radio frequency unit 1101, a network module 1102, an audio output unit 1103, an input unit 1104, a sensor 1105, a display unit 1106, a user input unit 1107, an interface unit 1108, a memory 1109, a processor 1110, and the like.

It may be understood by a person skilled in the art that the electronic device 1100 may further include a power supply (such as a battery) that supplies power to each component. The power supply may be logically connected to the processor 1110 by using a power management system, to implement functions such as charging, discharging, and power consumption management by using the power management system. A structure of the electronic device shown in FIG. 11 does not constitute a limitation on the electronic device, and may include more or fewer parts than those shown in the figure, or combine some components, or have different part arrangements. Details are not described herein again.

The processor 1110 is configured to receive a first input that is performed by a user for a first split screen in a split screen display mode.

The display unit 1106 is configured to display an input interface of isolation space in a window of the first split screen in response to the first input.

The processor 1110 is further configured to: receive a second input that is performed by the user for a first application in a window of a second split screen in the split screen display mode, and store first target data of the first application to the isolation space in response to the second input.

It can be learned that, the electronic device 1100 receives a first input that is performed by a user for a first split screen in a split screen display mode is received, and displays an input interface of isolation space is displayed in a window of the first split screen in response to the first input, so that the user can perform an operation of entering the isolation space from the window of the first split screen in a split screen state; and receives a second input that is performed by the user for a first application in a window of a second split screen in the split screen display mode, and stores first target data of the first application to the isolation space in response to the second input, so that interaction between the isolation space and the window of the second split screen can be implemented, and a function of performing data isolation by using the split screen is satisfied.

In some implementations, the processor 1110 is further configured to: receive a third input that is performed by the user for the second target data of the second application in the input interface of the isolation space, and edit the second target data in response to the third input.

In some implementations, the display unit 1106 is further configured to display an identity authentication input interface.

In some implementations, the processor 1110 is further configured to receive a fourth input that is performed by the user in the identity authentication input interface.

In some implementations, the display unit 1106 is further configured to display the input interface of the isolation space in the window of the first split screen when input information of the fourth input is successfully matched with pre-stored identity information.

In some implementations, the processor 1110 is further configured to: create a target application icon corresponding to the first target data in the input interface of the isolation space, where the target application icon is an icon of the first application; and associate and store the first target data and the target application icon.

In some implementations, the processor 1110 is further configured to copy an icon of the first application.

In some implementations, the display unit 1106 is further configured to display the copied icon of the first application in the input interface of the isolation space.

In some implementations, the processor 1110 is further configured to associate and store the first target data and the copied icon of the first application.

In some implementations, the processor 1110 is further configured to: receive a fifth input that is performed by the user for the first application in the window of the second split screen; and in a case that there is a difference between third target data corresponding to the fifth input and the first target data stored in the isolation space, update the first target data in the isolation space based on the third target data.

The electronic device 1100 provided in this embodiment of this application receives a first input that is performed by a user for a first split screen in a split screen display mode is received, and displays an input interface of isolation space is displayed in a window of the first split screen in response to the first input, so that the user can perform an operation of entering the isolation space from the window of the first split screen in a split screen state; and receives a second input that is performed by the user for a first application in a window of a second split screen in the split screen display mode, and stores first target data of the first application to the isolation space in response to the second input, so that interaction between the isolation space and the window of the second split screen can be implemented, and a function of performing data isolation by using the split screen is satisfied.

It should be understood that, in this embodiment of this application, the input unit 1104 may include a Graphics Processing Unit (GPU) 11041 and a microphone 11042, and the graphics processing unit 11041 processes image data of a still picture or a video obtained by an image capture apparatus (such as a camera) in a video capture mode or an image capture mode. The display unit 1106 may include a display panel 11061. The display panel 11061 may be configured in a form such as a liquid crystal display or an organic light-emitting diode. The user input unit 1107 includes a touch panel 11071 and another input device 11072. The touch panel 11071 is also referred to as a touchscreen. The touch panel 11071 may include two parts: a touch detection apparatus and a touch controller. The another input device 11072 may include but is not limited to a physical keyboard, a functional button (such as a volume control button or a power on/off button), a trackball, a mouse, and a joystick. Details are not described herein. The memory 1109 may be configured to store a software program and various data, including but not limited to an application program and an operating system. The processor 1110 may be integrated with an application processor and a modem processor. This application processor mainly processes an operating system, a user interface, an application program, and the like. The modem processor mainly processes wireless communication. It can be understood that, alternatively, the modem processor may not be integrated into the processor 1110.

An embodiment of this application further provides a readable storage medium. The readable storage medium stores a program or an instruction, and when the program or the instruction is executed by a processor, the processes of the foregoing data isolation method embodiment is performed, and the same technical effects can be achieved. To avoid repetition, details are not described herein again.

The processor is a processor in the electronic device in the foregoing embodiment. The readable storage medium includes a computer-readable storage medium such as a Read-Only Memory (ROM for short), a Random Access Memory (RAM for short), a magnetic disk, an optical disc, or the like.

An embodiment of this application further provides a chip. The chip includes a processor and a communication interface, the communication interface is coupled to the processor, and the processor is configured to run a program or an instruction to implement the processes of the foregoing data isolation method embodiment, and the same technical effects can be achieved. To avoid repetition, details are not described herein again.

It should be understood that the chip mentioned in this embodiment of this application may also be referred to as a system-level chip, a system chip, a chip system, or a system-on-a-chip.

An embodiment of this application further provides a computer program product, the computer program product is stored in a non-volatile storage medium, and the computer program product is executed by at least one processor to implement the processes of the foregoing method embodiment, and the same technical effects can be achieved. To avoid repetition, details are not described herein again.

An embodiment of this application provides an electronic device, configured to perform the processes of the foregoing method embodiments, and the same technical effects can be achieved. To avoid repetition, details are not described herein again.

It should be noted that in this specification, the term "include," "comprise," or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially or the part contributing to the related art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A data isolation method performed in a split screen display mode in which a display screen is divided into a first split screen and a second split screen, comprising:
   receiving a first input that is performed by a user for the first split screen in the split screen display mode;
   displaying an input interface of isolation space in a window of the first split screen in response to the first input;
   receiving a second input that is performed by the user for a first application in a window of the second split screen in the split screen display mode; and
   storing first target data of the first application to the isolation space in response to the second input while continuing to display the first application in the window of the first split screen, wherein the first target data stored in the isolation space is isolated from changes of the first application in the second split screen.

2. The data isolation method according to claim 1, further comprising:
   receiving a third input that is performed by the user for second target data of a second application in the input interface of the isolation space; and
   editing the second target data in response to the third input.

3. The data isolation method according to claim 1, wherein displaying an input interface of isolation space in a window of the first split screen comprises:
   displaying an identity authentication input interface;
   receiving a fourth input that is performed by the user in the identity authentication input interface; and
   displaying the input interface of the isolation space in the window of the first split screen when input information of the fourth input is successfully matched with pre-stored identity information.

4. The data isolation method according to claim 1, wherein when the first target data is partial data of the first application, the storing first target data of the first application to the isolation space comprises:
   creating a target application icon corresponding to the first target data in the input interface of the isolation space, wherein the target application icon is an icon of the first application; and
   associating and storing the first target data and the target application icon.

5. The data isolation method according to claim 1, wherein when the first target data is all data of the first application, the storing first target data of the first application to the isolation space comprises:
   copying an icon of the first application;
   displaying the copied icon of the first application in the input interface of the isolation space; and
   associating and storing the first target data and the copied icon of the first application.

6. The data isolation method according to claim 5, further comprising:
   receiving a fifth input that is performed by the user for the first application in the window of the second split screen; and
   when there is a difference between third target data corresponding to the fifth input and the first target data stored in the isolation space, updating the first target data in the isolation space based on the third target data.

7. An electronic device, comprising:
   a memory storing computer-readable instructions; and
   a processor coupled to the memory and configured to execute the computer-readable instructions, wherein the computer-readable instructions, when executed by the processor, cause the processor to perform operations comprising:
   receiving a first input that is performed by a user for a first split screen in a split screen display mode in which a display screen is divided into the first split screen and a second split screen;
   displaying an input interface of isolation space in a window of the first split screen in response to the first input;
   receiving a second input that is performed by the user for a first application in a window of the second split screen in the split screen display mode; and
   storing first target data of the first application to the isolation space in response to the second input while continuing to display the first application in the window of the first split screen, wherein the first target data stored in the isolation space is isolated from changes of the first application in the second split screen.

8. The electronic device according to claim 7, wherein the operations further comprise:
receiving a third input that is performed by the user for second target data of a second application in the input interface of the isolation space; and
editing the second target data in response to the third input.

9. The electronic device according to claim 7, wherein displaying an input interface of isolation space in a window of the first split screen comprises:
displaying an identity authentication input interface;
receiving a fourth input that is performed by the user in the identity authentication input interface; and
displaying the input interface of the isolation space in the window of the first split screen when input information of the fourth input is successfully matched with pre-stored identity information.

10. The electronic device according to claim 7, wherein when the first target data is partial data of the first application, the storing first target data of the first application to the isolation space comprises:
creating a target application icon corresponding to the first target data in the input interface of the isolation space, wherein the target application icon is an icon of the first application; and
associating and storing the first target data and the target application icon.

11. The electronic device according to claim 7, wherein when the first target data is all data of the first application, the storing first target data of the first application to the isolation space comprises:
copying an icon of the first application;
displaying the copied icon of the first application in the input interface of the isolation space; and
associating and storing the first target data and the copied icon of the first application.

12. The electronic device according to claim 11, wherein the operations further comprise:
receiving a fifth input that is performed by the user for the first application in the window of the second split screen; and
when there is a difference between third target data corresponding to the fifth input and the first target data stored in the isolation space, updating the first target data in the isolation space based on the third target data.

13. A non-transitory computer-readable medium storing instructions that, when executed by a processor, cause the processor to perform operations comprising:
receiving a first input that is performed by a user for a first split screen in a split screen display mode in which a display screen is divided into the first split screen and a second split screen;
displaying an input interface of isolation space in a window of the first split screen in response to the first input;
receiving a second input that is performed by the user for a first application in a window of the second split screen in the split screen display mode; and
storing first target data of the first application to the isolation space in response to the second input while continuing to display the first application in the window of the first split screen, wherein the first target data stored in the isolation space is isolated from changes of the first application in the second split screen.

14. The non-transitory computer-readable medium according to claim 13, wherein the operations further comprise:
receiving a third input that is performed by the user for second target data of a second application in the input interface of the isolation space; and
editing the second target data in response to the third input.

15. The non-transitory computer-readable medium according to claim 13, wherein displaying an input interface of isolation space in a window of the first split screen comprises:
displaying an identity authentication input interface;
receiving a fourth input that is performed by the user in the identity authentication input interface; and
displaying the input interface of the isolation space in the window of the first split screen when input information of the fourth input is successfully matched with pre-stored identity information.

16. The non-transitory computer-readable medium according to claim 13, wherein when the first target data is partial data of the first application, the storing first target data of the first application to the isolation space comprises:
creating a target application icon corresponding to the first target data in the input interface of the isolation space, wherein the target application icon is an icon of the first application; and
associating and storing the first target data and the target application icon.

17. The non-transitory computer-readable medium according to claim 13, wherein when the first target data is all data of the first application, the storing first target data of the first application to the isolation space comprises:
copying an icon of the first application;
displaying the copied icon of the first application in the input interface of the isolation space; and
associating and storing the first target data and the copied icon of the first application.

18. The non-transitory computer-readable medium according to claim 17, wherein the operations further comprise:
receiving a fifth input that is performed by the user for the first application in the window of the second split screen; and
when there is a difference between third target data corresponding to the fifth input and the first target data stored in the isolation space, updating the first target data in the isolation space based on the third target data.

* * * * *